US005474633A

United States Patent [19]

Myers

[11] Patent Number: 5,474,633

[45] Date of Patent: Dec. 12, 1995

[54] AIR ASSISTED TRANSFER PRESS AND METHOD

[75] Inventor: David A. Myers, Connellsville, Pa.

[73] Assignee: Stahls', Inc., St. Clair Shores, Mich.

[21] Appl. No.: 409,898

[22] Filed: Mar. 23, 1995

Related U.S. Application Data

[63] Continuation of Ser. No. 198,251, Feb. 17, 1994, abandoned.

[51] Int. Cl.$^6$ ........ B32B 3/00

[52] U.S. Cl. ........ 156/230; 156/583.1; 156/583.8

[58] Field of Search ........ 156/230, 358, 156/359, 580, 583.1, 583.8, 583.9; 100/93 P

[56] References Cited

U.S. PATENT DOCUMENTS

| | | | |
|---|---|---|---|
| D. 340,730 | 10/1993 | Myers | D15/146 |
| 2,624,389 | 1/1953 | Bungay | 154/1 |
| 2,644,151 | 6/1953 | Krueger | 340/227 |
| 3,035,510 | 5/1962 | Carpenter et al. | 100/93 |
| 3,450,031 | 6/1969 | Peterson | 100/93 |
| 3,454,741 | 7/1969 | Stewart | 219/243 |
| 3,567560 | 3/1971 | Stiff | 156/583 |
| 3,823,054 | 7/1974 | Balzer et al. | 156/530 |
| 3,878,015 | 4/1975 | Johnston | 156/222 |
| 3,923,590 | 12/1975 | Humphries | 156/580 |
| 3,925,139 | 12/1975 | Simmons | 156/358 |
| 3,979,248 | 9/1976 | Kussmaul | 156/358 |
| 3,982,418 | 9/1976 | Leavesley et al. | 73/11 |
| 4,055,456 | 10/1977 | Carnegie, Jr. | 156/366 |
| 4,083,205 | 4/1978 | Clarke et al. | 156/583.9 X |
| 4,190,485 | 2/1980 | Takeda et al. | 156/583.9 |
| 4,243,470 | 1/1981 | Higashiguchi | 156/583.9 |
| 4,378,266 | 3/1983 | Gerken | 156/359 |
| 4,379,018 | 4/1983 | Griesdorn | 156/359 |
| 4,386,993 | 6/1983 | Matsuo | 156/358 |
| 4,421,589 | 12/1983 | Armini et al. | 156/382 |
| 4,469,545 | 9/1984 | Löw | 156/359 |
| 4,713,047 | 12/1987 | Klinkel | 493/34 |
| 5,167,750 | 12/1992 | Myers | 156/583.9 |
| 5,252,171 | 10/1993 | Anderson et al. | 156/358 |

FOREIGN PATENT DOCUMENTS

| | | |
|---|---|---|
| 2170443 | 1/1986 | United Kingdom . |

*Primary Examiner*—David A. Simmons
*Assistant Examiner*—J. Sells
*Attorney, Agent, or Firm*—Brooks & Kushman

[57] ABSTRACT

A heat applied transfer press includes a manual actuator for displacing platens between open and closed positions as well as a pneumatic engager for pressing the platens together when the actuator has been moved to the closed position. A sensor determines when the actuator has moved the upper platen to the closed position so as to permit application of pressure to urge the heated upper platen toward and against transfer indicia and the apparel arranged on the lower platen. Another sensor determines when the pressure application has been initiated to time the duration of the pressure application. The control automatically releases the pressure and opens the press after the time duration matches a selected time duration set by the control.

10 Claims, 8 Drawing Sheets

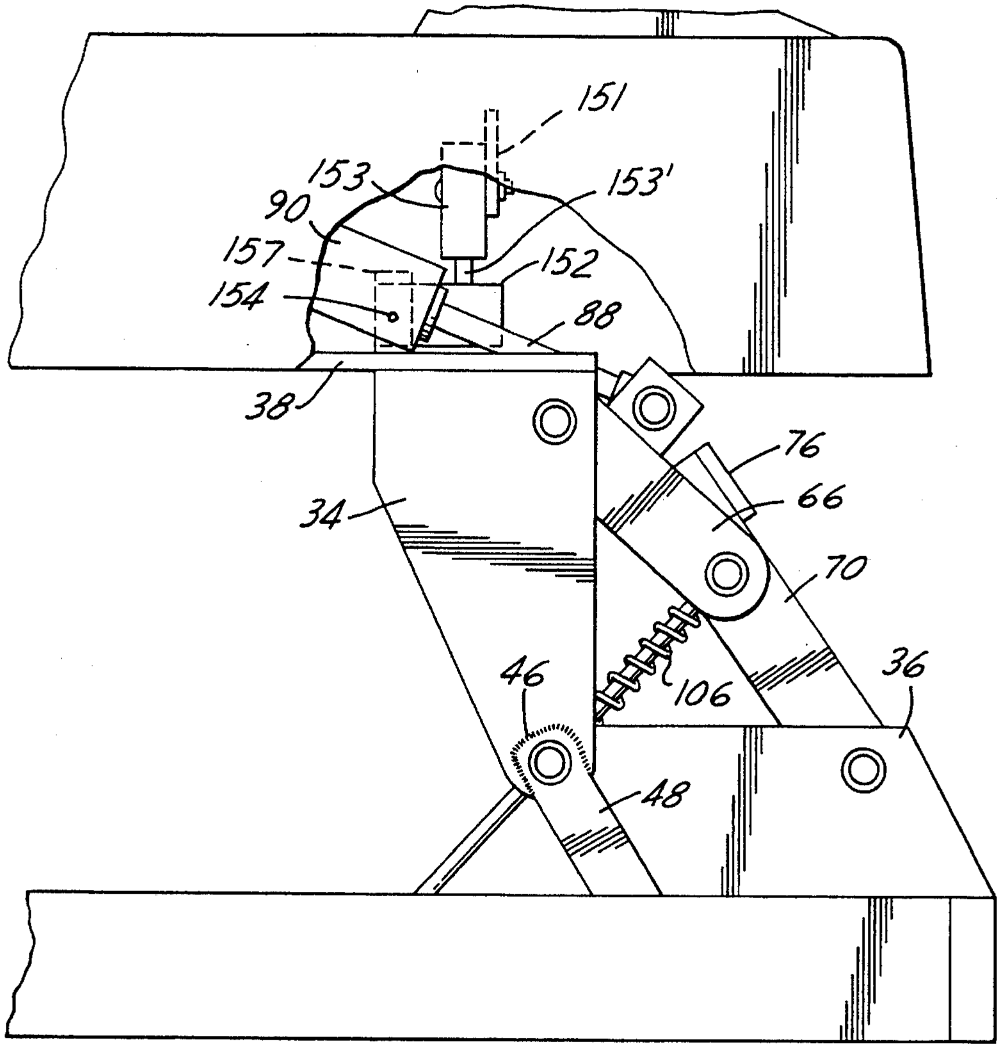
FIG.5
FIG.7
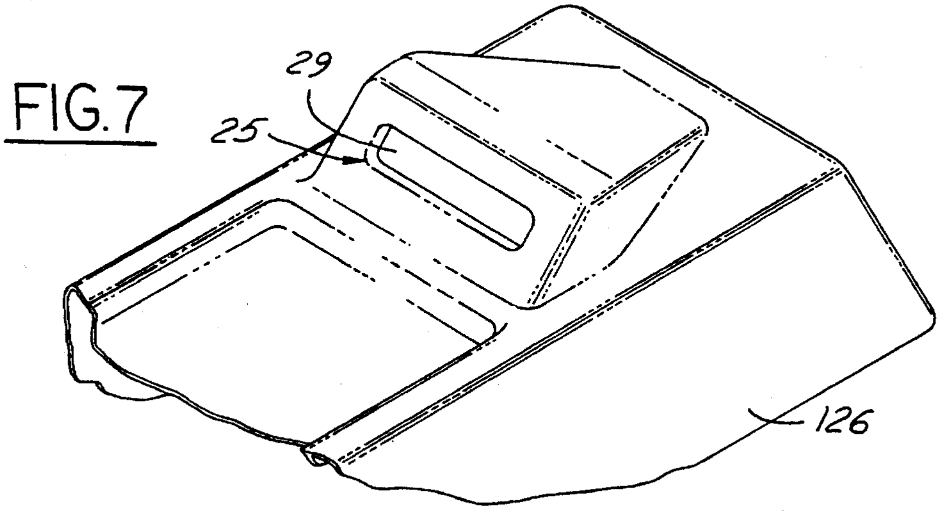

AIR ASSISTED TRANSFER PRESS AND METHOD

This is a continuation of application Ser. No. 08/198,251 filed on Feb. 17, 1994, abandoned.

FIELD OF THE PRESENT INVENTION

The present invention relates generally to heat applied transfer presses, and more particularly to such presses that have a manual operator to displace platens between open and closed positions and a pneumatically assisted, selective pressure engager with an automatic pressure releaser.

BACKGROUND ART

Heat applied transfers include a variety of indicia with inks, material layers, and adhesives that become bonded to material layers, for example, apparel such as shirts, jackets, or the like, upon pressurized contact and heating of the transfers and apparel between press platens. New developments in the construction and composition of lettering have resulted in high quality transfers that can be accurately and quickly transferred to the apparel without bleeding or partial interruptions in the bonding of the transfer, as long as the presses can be operated at a predetermined temperature for a predetermined time and at a predetermined pressure. Nevertheless, heat applied transfer presses must be simple, manually operated devices in order to satisfy the user's need to economically but quickly apply various lettering, symbols and numbering indicia selected by a customer and which must be applied to a selected piece of apparel. Such an apparatus must accommodate many variations in the arrangement of transfers and apparel, as well as the types of transfers and apparel materials available.

The accuracy and precision of the temperature, the pressure and the time duration for which these parameters are applied to the transfers are particularly important to complete an efficient bonding of the transfers to materials. In particular, depending upon materials and the structure of the indicia to be applied to the apparel, indicia may be subject to inconsistent application conditions throughout the surface of apparel to which the transfer is applied. For example, excessive temperature may cause the ink or adhesive to bleed into the apparel material so that the indicia becomes discolored or a blend of different colors thus changing the original appearance of the indicia intended to be applied. Likewise, the application of excessive pressure may cause bleeding of the colors while insufficient pressure between the platen pressing surfaces may result in blotched or unattached areas where the indicia failed to adhere completely to the garment.

Many recent developments in heat applied transfer presses have improved the accuracy of temperature maintenance in the platens. Other improvements have permitted variation in the amount of pressure which is applied or the manner in which the pressure is applied between the upper and lower platens. Temperature monitoring has also been improved with more accurate thermocouples and digital readouts readily visible to users of the transfer press. Nevertheless, with all these improvements, the efficient and complete transfer of heat applied transfer indicia to apparel and other items is still primarily dependent upon the attention and dedication of the user of the press for the reason that the time dependent application of temperature and pressure necessary to complete the transfer requires the manual intervention of the user. In particular, while the time may be accurately determined and indicated, and the temperature and pressure may be maintained precisely and accurately throughout the predetermined time, the release and separation of the platens is entirely manually controlled by the operator in timely response to the indicator's messages to the user.

Moreover, there may be differences in the manner in which users actuate opening and closing of the platen, or arranging of the material and transfer indicia which are to be applied to the apparel material. For example, individual lettering indicia may not be properly spaced if the open position of the platens in the transfer press obstructs the manipulation of lettering over the surface of the platen. Further the open position of the platen should not expose the users' hands to contact with the heated platen during arrangement of the transfers. Moreover, environmental structures such as counter tops, cash registers or retail racks can restrict the movement or spacing of the platens and limit free movement during arrangement of transfer and apparel over the pressing surface of the platen on which the apparel and transfers are retained during pressing.

Furthermore, the release of pressure to the platens by a manual operator is often accompanied by simultaneous and rapid displacement of the platens away from each other. Forced manual displacement of the platens with a not fully cured or incompletely bonded indicia may tend to detach the transfer from the apparel to which it is applied. For example, surface contact adhesion between the pressing surface and the transfer as well as the suction created by rapid separation of the large area platen surfaces may contribute to sticking of the indicia upon the platen rather than the apparel. Of course, once the indicia has been applied to the garment, corrections cannot be easily made, and defective applications may result in the disposal of an entire expensive garment in order to correct a mistake. Such consequences are hardly justifiable and are intolerable where the user of the press is conscientiously attempting to rapidly produce decorated apparel while following all recommendations regarding proper timing, temperature and pressure regulation provided by the manufacturer.

SUMMARY OF THE INVENTION

The present invention overcomes the above-mentioned disadvantages by providing a manually operated heat applied transfer press with an air assisted pressure engager and a pressure releaser. In general, the press comprises upper and lower platens which are manually displaced to and between an open position and a closed position. In the closed position, an air assisted pressure engager displaces the upper platen from a raised position to a pressing position toward the lower platen. A time dependant releaser relieves pressure between the platens and opens the transfer press automatically upon expiration of a predetermined time duration for most efficient and complete transfer of the transfer indicia to the apparel. Preferably, the releaser of the device has a two stage release mechanism so that the pressure release occurs before an accelerated displacement of the upper platen from the lower platen is initiated. As a result, the preferred embodiment avoids the suction-adhesion or the like which tends to separate the transfers from the apparel in previously known manually operable heat applied transfer presses.

In the preferred embodiment, a user actuates an operator that separates the upper platen a substantial distance from the lower platen so that access to the lower platen is unobstructed to permit convenient arrangement of the transfer indicia and apparel over the lower platen. In one version of the invention, the upper platen pivots upwardly away from the user facing the lower platen. The platen pivots about a horizontal pivot axis disposed rearwardly of the user operating the press. In another version, the upper platen pivots about a vertical axis for movement laterally away from the lower platen so as to be located out of registration with the pressing surface area of the lower platen.

In either event, the upper platen is manually moved to a closed position at which the pressing surface of the upper platen registers with the pressing surface of the lower platen but spaced from contact with the lower platen. Preferably, the lower platen remains stationary during closing of the press so that the apparel laid over the platen and the arrangement of indicia on the material laid over the lower platen is not forced to shift or otherwise move by actuation of the engager that applies pressure to the platens. Accordingly, once the actuator has been moved to place the upper platen in its closed position, a selectively operable engager applies pneumatic pressure to the upper platen to displace it toward the lower platen-from a raised position to a pressing position in which a predetermined pressure can be applied to press the heat applied transfer indicia against the material of the apparel.

The application of pressure triggers a timer that actuates a releaser a predetermined time duration after the upper platen reaches its pressing position. The releaser preferably relieves pneumatic pressure between the upper and lower platens and displaces the upper platen to the open position. In the preferred embodiment, the pressure release occurs prior to forced displacement of the upper platen from the closed position so as to assure completion of the transfer before forced displacement of the platen causes suction or adherence forces which tend to separate, the indicia from the apparel during opening of the press. Accordingly, forced displacement may be delayed until bonding has been completed for the proper time, temperature and pressure parameters recommended by the manufacturer for complete transfer.

As a result, the present invention provides a heat applied transfer press that permits completion of the transfer before forced displacement of the press platens causes unintended disruption of the bonding process. The present invention also provides a heat transfer press which applies a predetermined pressure at a predetermined temperature for a predetermined time and automatically discontinues the pressing operation when the predetermined time, temperature and pressure have been applied to the indicia arranged on material between the platens. Moreover, the press provides substantially more consistent and more complete transfers to apparel and less defective products than previously known heat transfer presses. In addition, neither closure of the press nor operation of the engager impose unintended rearrangement of indicia or displacement of the material laid on the lower platen. As a result, the transfer press of the present invention presents substantially less risk to the user and produces a higher number of high quality heat applied transfer products than previously known heat applied transfer presses. In addition, the pneumatically assisted squeezing of the upper platen against the transfer and garment between the platens, and the automatic termination of the squeezing cycle, substantially reduces fatigue and stress on the user.

BRIEF DESCRIPTION OF THE DRAWING

The present invention will be more clearly understood by reference to the following detailed description of a preferred embodiment of the present invention when read in conjunction with the accompanying drawing in which like reference characters refer to like parts throughout the views and in which:

FIG. 5 is a view similar to FIGS. 3 and 4 but showing an intermediate position of the mechanism on its way from the closed position to the open position;

FIG. 7 is a perspective view of a preferred housing configuration constructed according to the present invention;

DETAILED DESCRIPTION OF A PREFERRED EMBODIMENT

Figure 1:
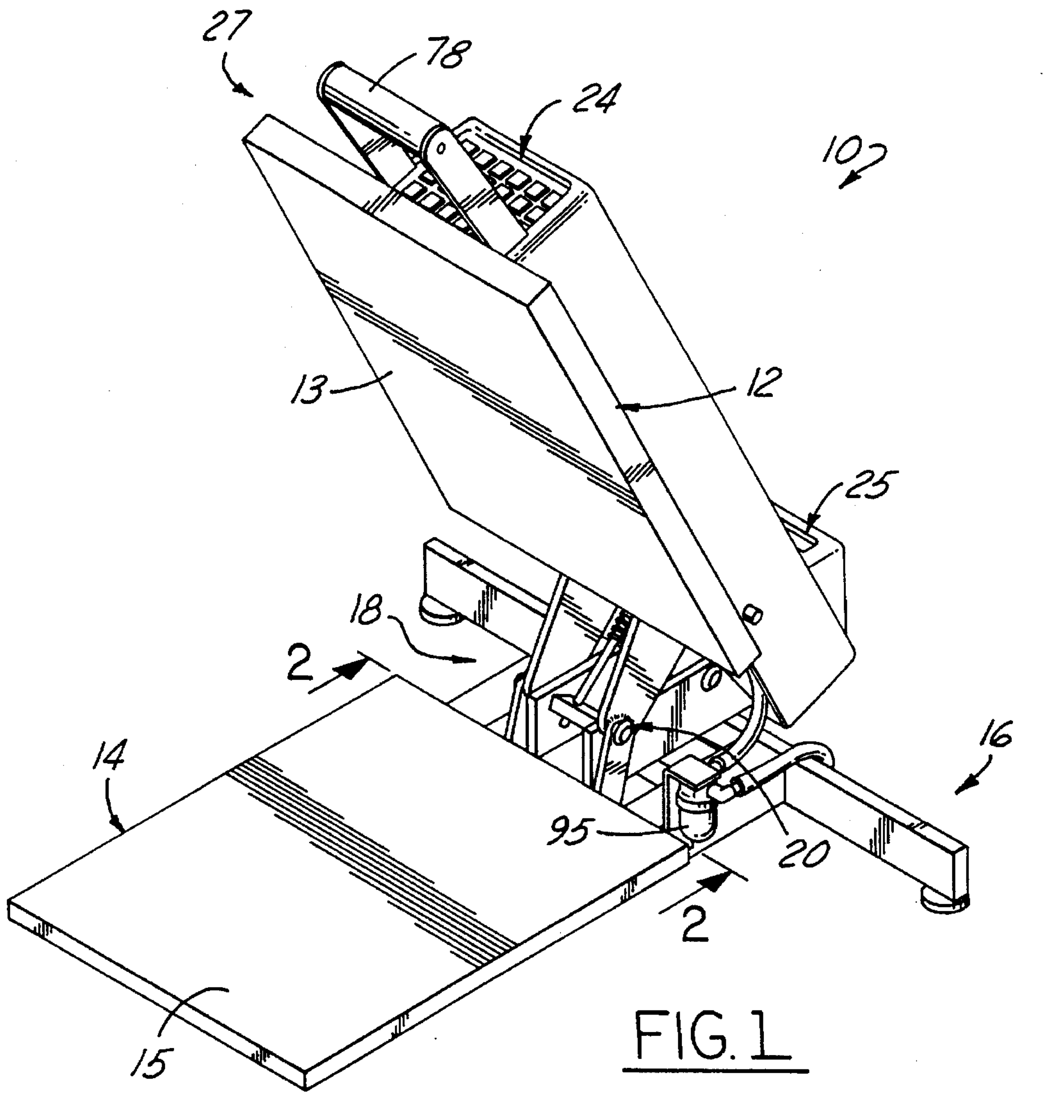
FIG. 1 is a perspective view of a heat applied transfer press according to the present invention.

In the embodiment shown in FIGS. 1–8 the upper platens swings vertically between open and closed positions, while in FIGS. 9–13 it swings horizontally. Whether the upper platen swings vertically or horizontally, operation of the two embodiments at the closed position to effect heat transfer of indicia to garments is similar, and differs only as specifically mentioned hereafter. As a consequence, in this description, reference for purposes of explanation may be made to common structures of either embodiment.

Referring first to the embodiment of FIGS. 1–8, a heat applied transfer press 10 is shown comprising an upper platen 12 and a lower platen 14 mounted on a base 16. An operator 18 for the upper platen 12 carries the upper platen 12 to and between a closed position in which the pressing surface 13 of upper platen 12 is aligned in registration over the pressing surface 15 of the lower platen in close proximity to the lower platen 14, and an open position in which the upper platen 12 is spaced from close proximity and positioned out of registration with the lower platen 14.

Figure 14:
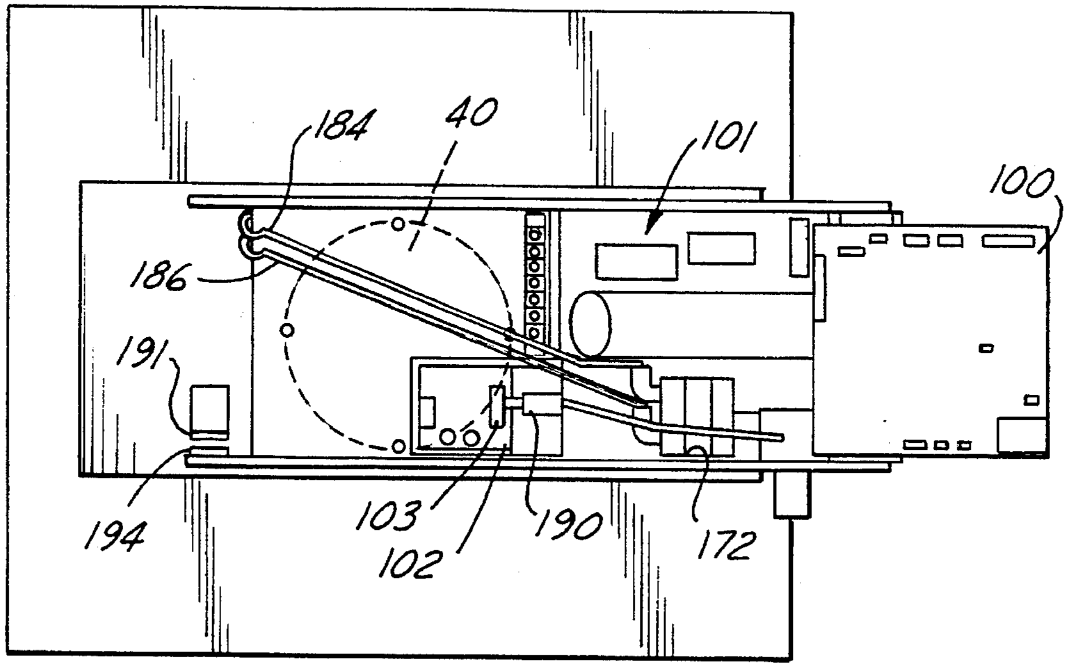
FIG. 14 is a plan view of the apparatus shown in FIG. 8 showing some portions removed from the apparatus in FIG. 8.

As with other heat applied transfer presses, the apparatus 10 includes means for heating at least one of the platens, preferably the upper platen, and an appropriate control for the temperature, for example as shown in U.S. Pat. No. 5,252,171 to Anderson et al., is incorporated herein by reference, for generating heat at a selectively predetermined temperature on the pressing surface of the platen. In addition, the operator 18 includes an actuator for manually controlling displacement of the upper platen and appropriate controls to adjust timing, temperature, pressure and relative positions between the platens and closed position as is well known in the art. For example, the control may include a key pad 24, an indicia display 25 (FIGS. 1 and 7) and an electronic controller 101 including a control board 100 and an air control board 102 with a piezoelectric pressure sensor 103 to simplify a user's interfacing with and operation of the heat transfer press 10 as shown in FIG. 14. For example, the control board disclosed in U.S. Pat. No. 5,252,171 is modified with the strain gage input modified to include a different program and adapted to receive data from the electronic, air pressure printed circuit board 102 and the sensor 103.

In general, the operator 18 carrying the upper platen 12 combines the pivot mechanisms such as 20 (FIGS. 1–8) or 22 (FIGS. 9–12) with an engager 26 for applying pneumatic pressure on the upper platen 12 to displace it toward the lower platen from a raised position to a pressing position after the actuator has been manipulated to position the upper platen in the closed position. In addition, the operator 18 includes a releaser 28 for relieving pneumatic pressure between the upper and lower platens after a selected time interval from actuation of the engager 26. As a result, the present invention provides an automatic but controlled release of the platens to assure proper timing of the temperature and pressure application used to transfer the heat applied transfers to apparel in the press.

In the heat applied transfer press 10, the engager 26 includes the pivot mechanism 20 for displacing the upper platen 12 to and between open and closed positions and a pneumatically actuated displacer 30 for moving the upper platen 12 to said pressing position from the raised position when the actuator 18 has moved the support to the closed position. In addition, the releaser 28 includes the pivot mechanism 20 and an initiator 104 for displacing the upper platen from said closed position to the open position, preferably after a predetermined time delay from the release of pressure that drives the platen to the pressing position at the termination of the time interval selected for control of the heat applied transfer press.

As best shown in FIGS. 2–5, the support 18 includes a stanchion 34 pivotally coupled to the base 16 at a support plate 36 by a pivot pin 42 aligned with a horizontal pivot axis. The stanchion 34 comprises a pair of spaced plates overlapping a pair of upright plates forming the support plate 36. The stanchion 34 supports a support arm 38 carrying a piston/cylinder arrangement 40 (FIG. 6) at a cantilevered position from the pivot pin 42. A piston arm 142 of the piston/cylinder 40 depends from the arm 38, and the end of the piston arm 142 carries the upper platen 12.

Figure 15:
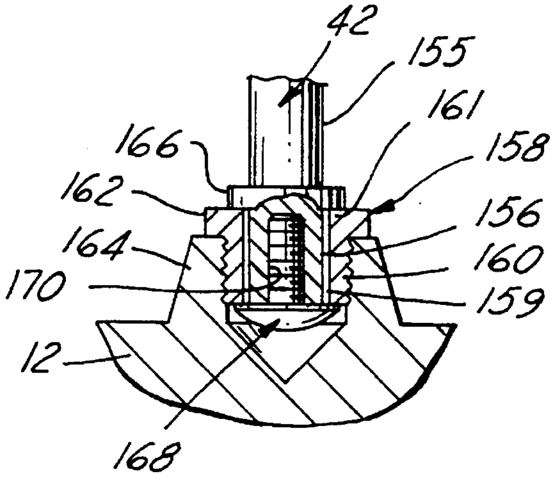
FIG. 15 is an enlarged sectional view of a connection of the upper platen to the operator according to the present invention.

Preferably, a swivel type connector couples the piston arm 142 to the platen 12 to permit limited realignment of the pressing surface plane 13 to accommodate differing thicknesses of indicia and apparel across the pressing surfaces that may be positioned between the platens. For example, in a manner previously known as described in my application Ser. No. 08/141,800, piston arm 142 has a threaded portion 155 (see FIG. 15) and an end portion 156 dimensioned to be received within an interior bore of an adjustment bushing 158. The bushing 158 includes an annular, exteriorly threaded body 160 and a hexagonal head 162. The threaded body 160 is received in a correspondingly threaded bore of a boss 164 on the upper platen 12. An enlarged shoulder 166 extends radially outwardly from the piston arm 142 between the spindle end 156 and the cylinder 4. The bore 159 of the bushing 158 has a diameter slightly greater than the diameter of the spindle end 156 and includes a chamfered upper end 161 adjacent the hex head 162. The resulting annular space between the spindle and the bushing permits swivel adjustment between the platen 12 threadedly engaged with the bushing 158 and the spindle end 156 of the arm 142. The bushing 158 is retained on the spindle 156 by means of a headed bolt 168 engaged in a correspondingly threaded bore 170 extending into the spindle end 156.

Actuation of the piston cylinder 40 by the electronic control 101, as will be described in greater detail below, displaces the platen 12 from the raised position shown in solid line in FIG. 6 to the pressing position shown in phantom line in FIG. 6. In the pressing position, the pressing surface 13 of the upper platen 12 is urged toward and against the transfers and material covering the pressing surface 15 of the lower platen 14. As also best shown in FIG. 6, the platen 14 is rigidly supported upon the base 16 by stationary stanchion 44 extending upwardly from the base 16. As a garment may be draped over the lower platen 14 for application of a transfer, the rigid stanchion 44 for the lower platen 14 maintains the fixed position of the apparel material overlapping the pressing surface 15 of the lower platen 14 so as not to disturb the material or rearrange the transfer indicia laid upon the apparel before pressing.

Figure 3:
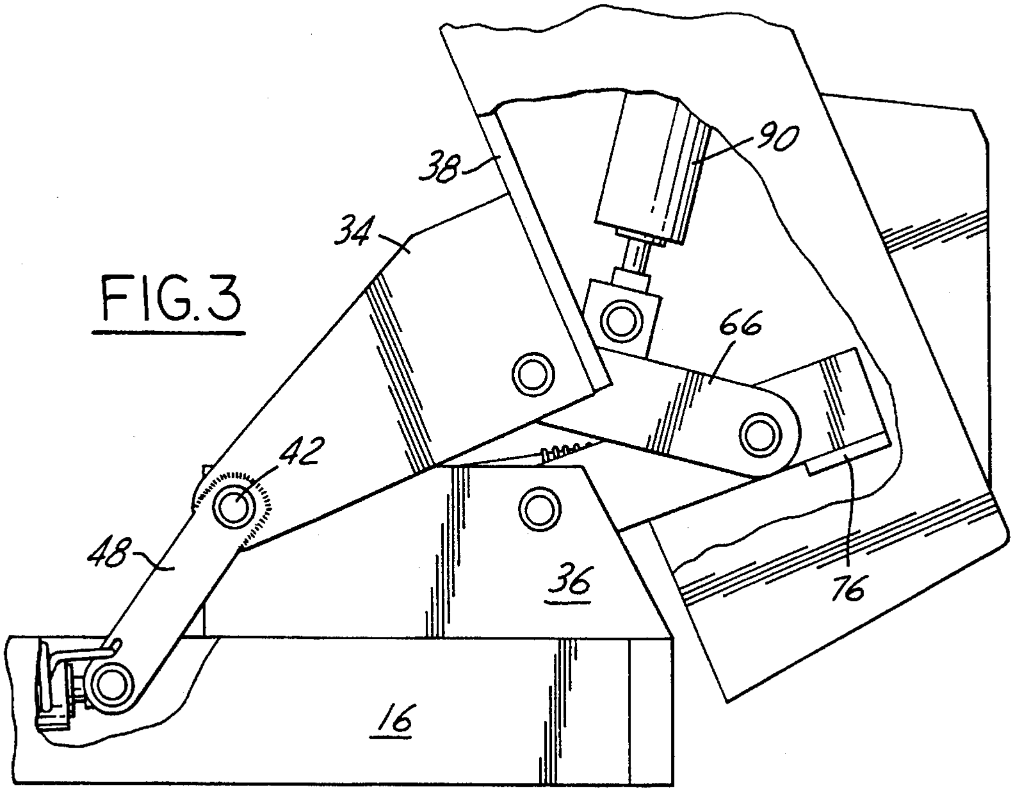
FIG. 3 is an enlarged sectional view of the pivot mechanism employed in the embodiment shown in FIGS. 1 and 2.
Figure 4:
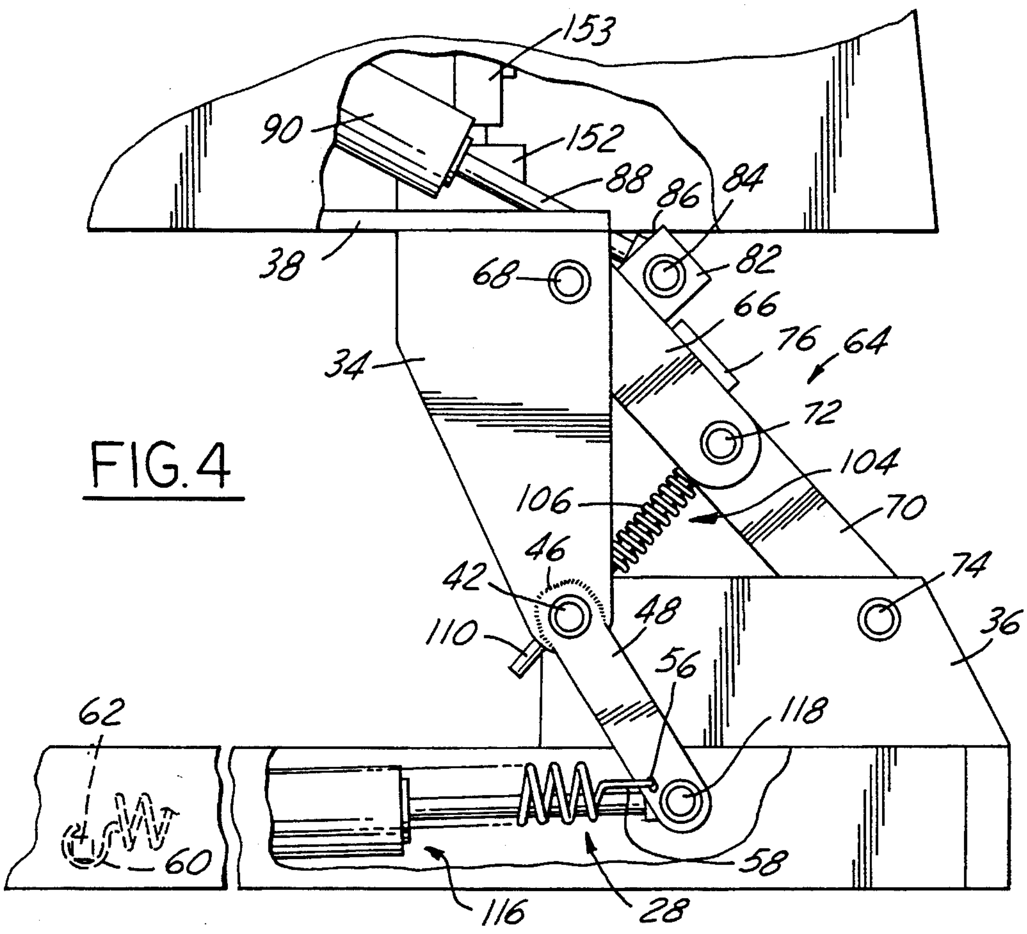
FIG. 4 is a view similar to FIG. 3 but showing the press platens in a closed position.

Referring again to FIGS. 2–5, the stanchion plates 35 are coupled, for example by welds 46, to one end of a pair of lever arms 48. The other ends of the lever arms 48 are connected by a bar 50 carrying a pivotal connector 52. The connector 52 provides attachment of the lever arms 48 to the end of a piston arm 54. The lever arms 48 carry spring ends 56 of biasing springs 58 (FIG. 4). The other end 60 of each of the two springs 58 are secured to a fixed member 62 forming part of the base 16 (FIG. 4).

As shown in FIG. 4, the pivot mechanism 20 also includes an overcenter locking mechanism 64 comprising a lever arm 66 pivoted at one end on the stanchion 34 by a pivot pin 68 and at its other end to a locking lever 70 by a pivot pin 72. In addition, the other end of the lever arm 70 is pivotally secured to the support plate 36 at a pivot pin 74 spaced rearwardly of the pivot pin 42. Like the other members, each of the levers 66 and 70 comprise a pair of lever plates. In addition, an extended end portion of the lever 70 includes a transverse flange 76 that engages the edge of at least one lever arm plate 66 of the overcenter locking mechanism 64. The flange 76 limits overcenter displacement to control closed position alignment of the levers 66 and 70.

The actuator 27 includes a handle 78 extending outwardly from the end of the arm 38 below the keypad 24 (see FIG. 1). The handle is grasped by a user to move the upper plate 12 from the open position shown in FIGS. 1 and 3 to the closed position shown in FIG. 4 or the solid outline position in FIG. 6. When in the closed position, the actuator also includes means for insuring that the overcenter locking mechanism 64 is engaged in its overcenter position. In particular, the locking means comprises stanchions 82 supported on the lever arm 66 for retaining a pivot pin 84 for engagement with a connector 86 on the end of a piston rod 88 to a locking cylinder arrangement 90.

The locking cylinder 90 receives pneumatic pressure that urges the piston 88 outwardly and assures that the lever arms 66 and 70 are locked in their overcenter position as shown in FIG. 4. The cylinder 90 becomes operative in response to the closing action by a signal delivered to locking valve 96 (FIG. 8) from control board 100 for introduction of air to the locking cylinder 90 once the support 38 reaches its closed position. The signal may be generated by a proximity switch 98 (FIGS. 5 and 6) such as a micro-switch 153 carried by mating surfaces on top weldment bracket 151 and switch arm 152 which is contacted by the pivot arm 66 when the upper platen has been lowered to its locked and closed position of FIG. 4. The switch arm 152 pivots about pivot axis 154 (FIG. 5) through support 157. Such a mounting permits the plunger 153' of the micro-switch 153 to be displaced without direct contact with the pivot arm 66 which traverses a larger distance and could impose larger impact forces against the micro-switch 153 if it were to be engaged directly by arm 66.

Figure 8:
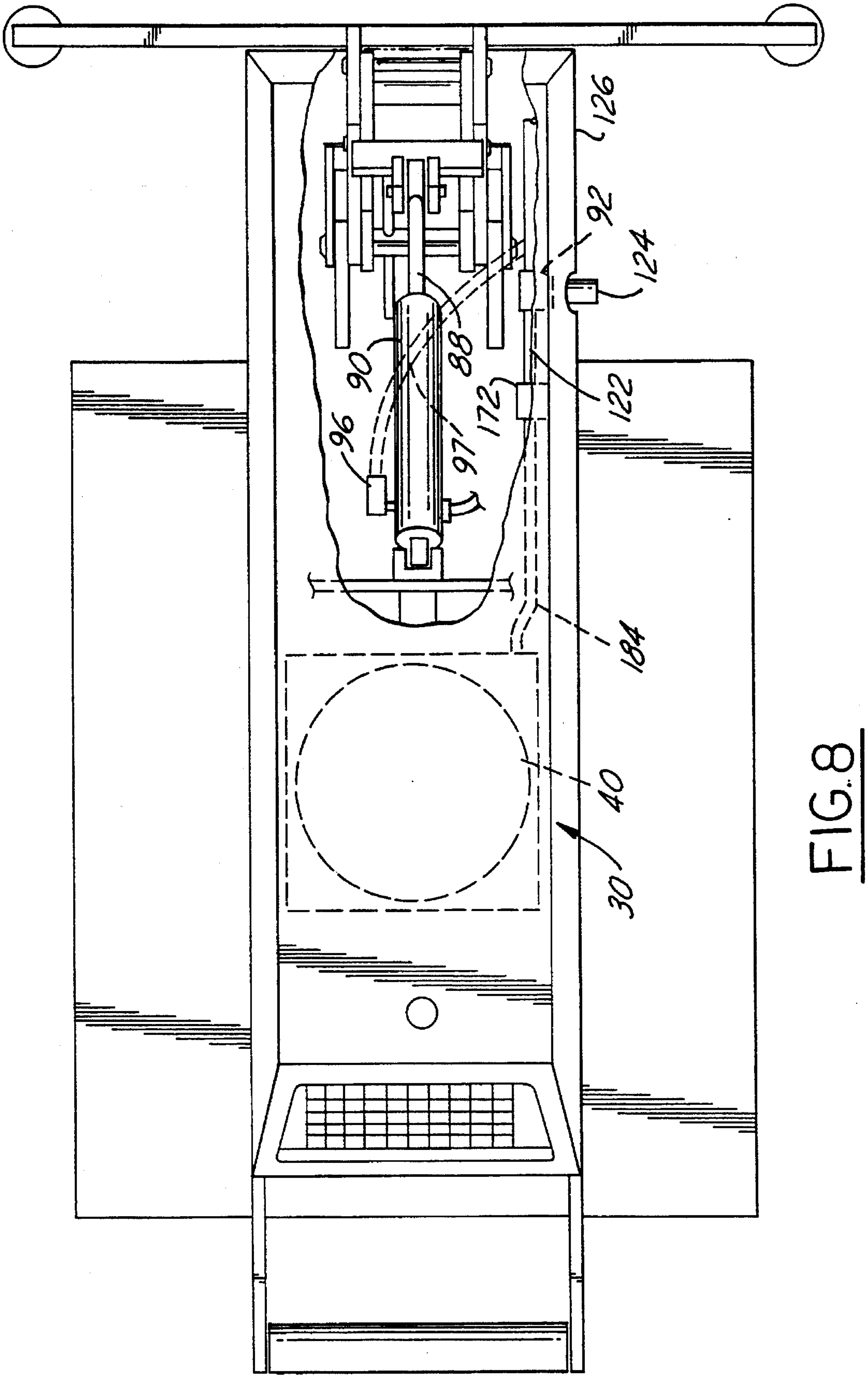
FIG. 8 is a plan view of the apparatus shown in FIG. 6 with portions broken away for the sake of clarity.
Figure 10:
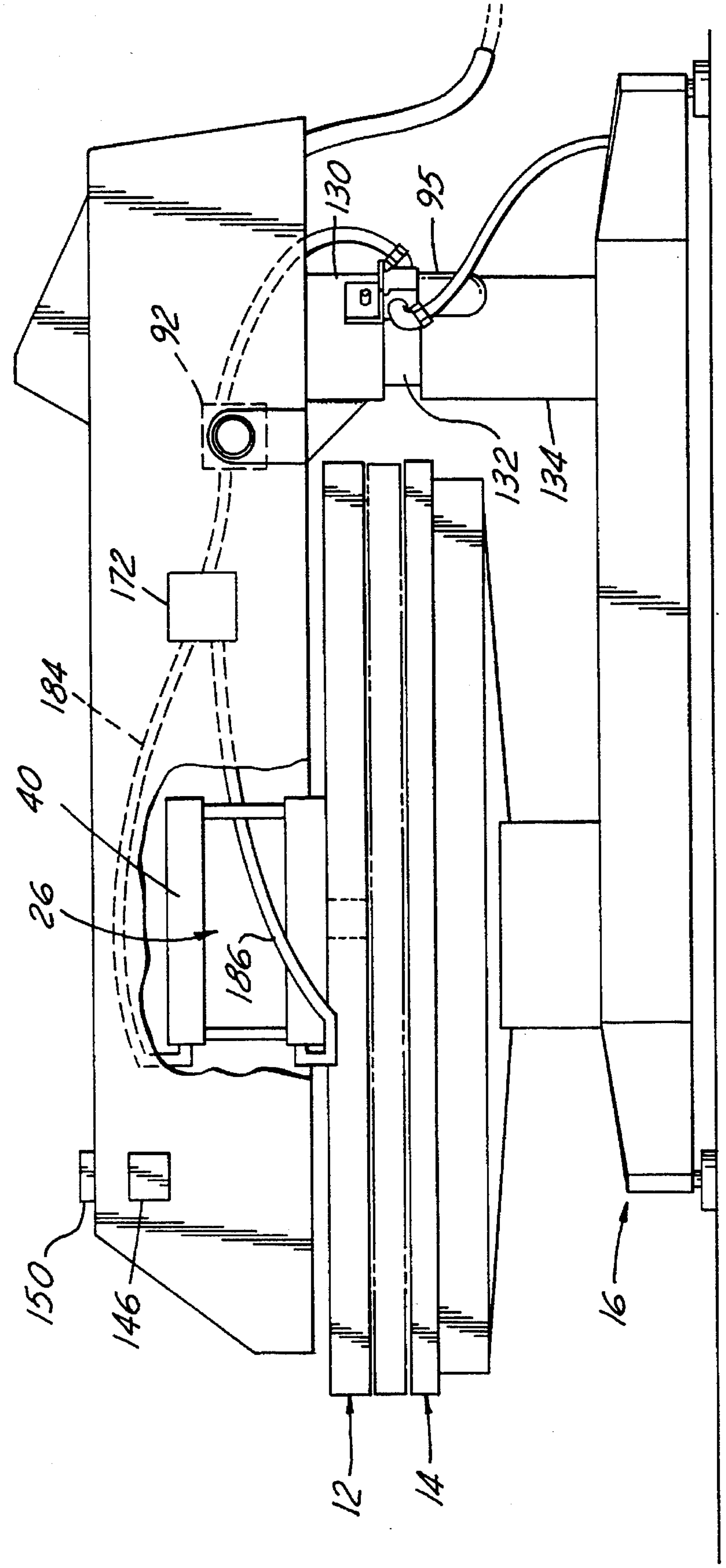
FIG. 10 is a side plan view of the apparatus shown in FIG. 9 with portions removed for the sake of clarity.

The piston rod 88 is extended in response to a signal from the control board 100 (FIG. 14) sent in response to actuation of switch 153. The signal from the control board 100 to the locking valve 96 (FIGS. 8 and 14) opens the valve 96 to couple the air source 94 to the locking cylinder 90. The locking valve 96 is a solenoid valve having a cylinder pressurizing mode introducing line pressure to the cylinder 90, and a discharge mode disconnecting the cylinder 90 from the air source 94 and exhausting pressurized air from the cylinder 90. For full line pressure, the valve 96 may be coupled to the air source 94 by way of a line 97 extending from upstream of the pressure regulator 92, as shown in FIG. 8. In addition, the press preferably carries an air filter 95 (FIG. 1) for filtration of the pressurized air from the source 94 such as a conventional compressor, to the valve 96 and regulator 92.

Figure 6:
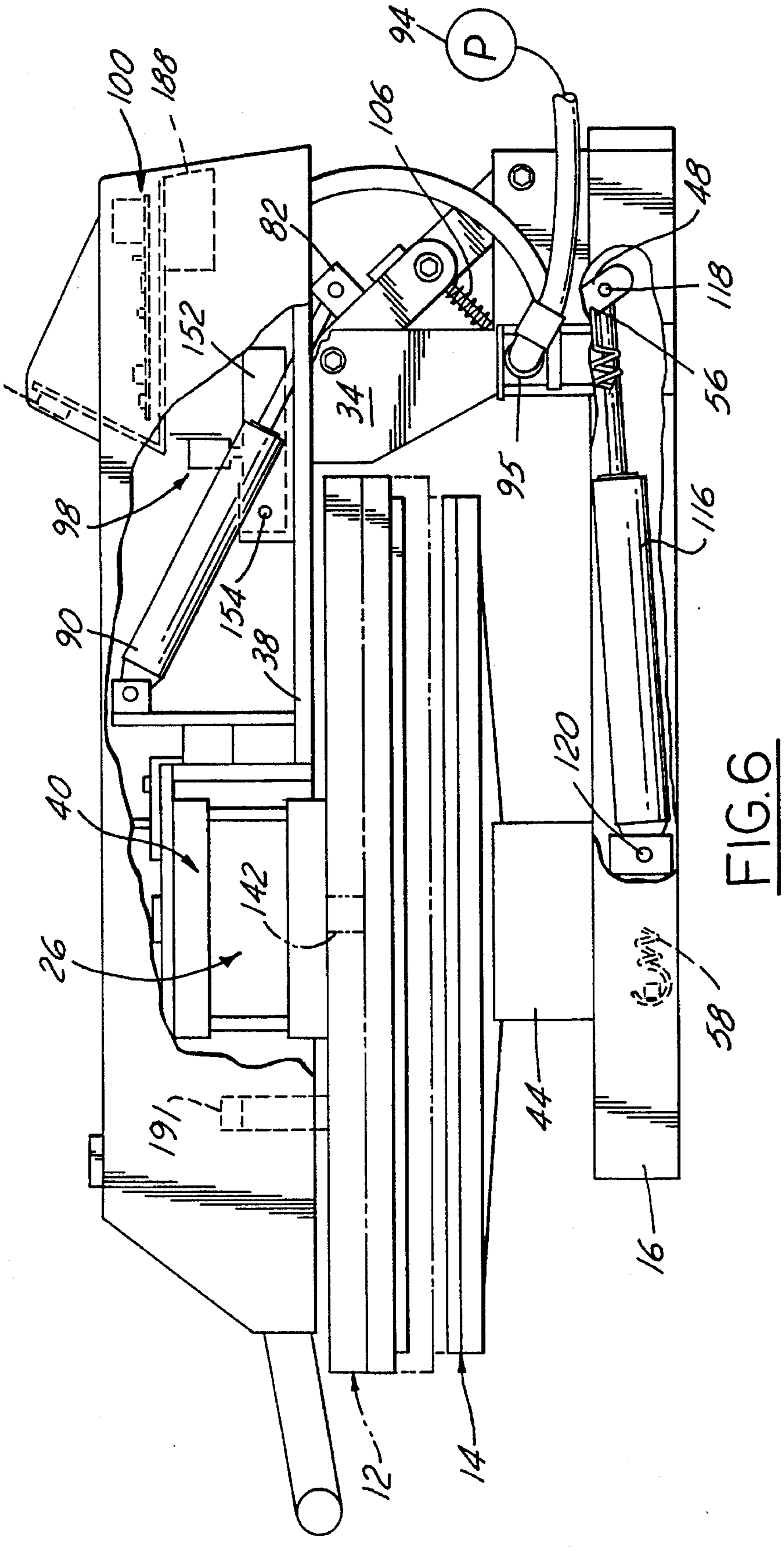
FIG. 6 is a side elevational view of the apparatus shown in FIGS. 1–5 with parts broken away for the sake of clarity.

Referring now to FIG. 6, when the upper platen 12 has been moved to its closed position, (shown in FIGS. 4 and 6) as sensed by proximity switch 153 and signalled by the electronic controller, a control valve 172 (FIG. 8) initiates the flow of pressurized air from the regulator 92 (FIG. 8), that is coupled through the filter 95 to the pressurized air source 94. The air is delivered to the piston/cylinder 40 through line 184 (FIGS. 8 and 14) to a piston-extending chamber in the cylinder 40. With the introduction of pressurized air to the cylinder 40, the piston 142 urges the platen 12 toward the platen 14 from its raised (closed) position shown in solid line in FIG. 6, to its pressing position shown in phantom line in FIG. 6.

As the platen 12 is pressed toward the platen 14, the control board 100 receives a signal from proximity switch 190 which senses the downward movement of the platen relative to the support plate 38 thereby actuating a counter on control board 100 which monitors the duration of press closure and compares it with the set or desired time length. The proximity switch includes a permanent magnet 91 mounted on a post 193 carried by the platen 12, and a reed switch 194 carried by the support plate 36. When the counter reaches a predetermined default time duration or a set time duration previously input by the user from the keypad 24, the control valve 172 receives a signal from the control board to terminate the pressing operation and responds by closing the flow path through line 184 from the regulated output of regulator 92 from air source 94 to the piston extending chamber of cylinder 40, while introducing the regulated air supply to the piston-retracting chamber through line 186 (FIG. 14) and exhausting the air from the extension chamber of the cylinder 40 through line 184. As a result, the platen 12 is urged upwardly away from the platen 14 by cylinder 40.

Figure 2:
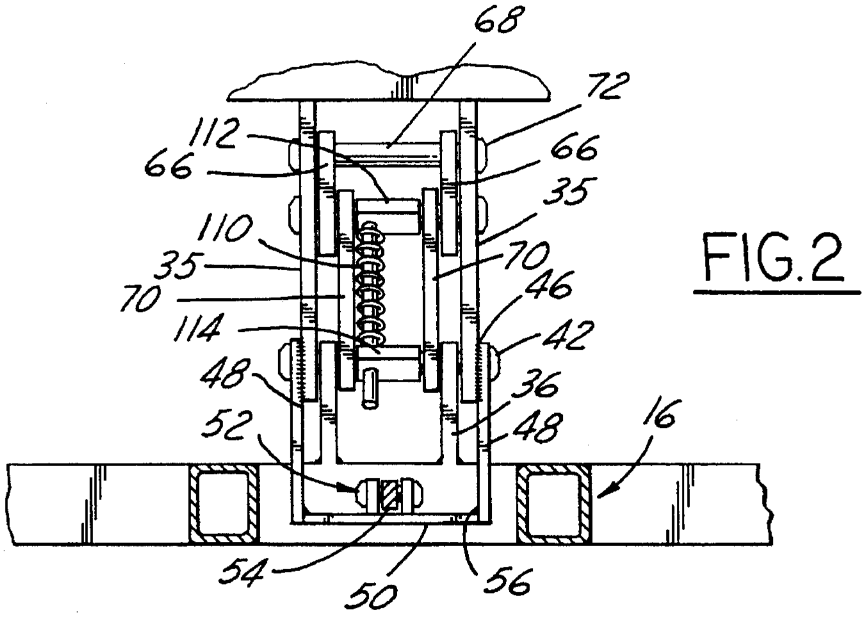
FIG. 2 is an enlarged sectional view taken substantially along the line 2—2 in FIG. 1 with portions removed for the sake clarity.

Moreover, as shown in FIGS. 2 and 4, the releaser 28 includes an initiator 104 that releases the overcenter locking mechanism 64 from its overcenter locked position. In the preferred embodiment, the coil spring 106 is carried over a alignment pin 110 intermediate the pivot pin 72 and the pivot pin 42. The alignment pin 110 is secured to the pivot pin 72, for example, by insertion in an opening of a block 112 (FIG. 2) carried by the pivot pin 72. The other end of the alignment pin slides in a throughbore in a block 114 (FIG. 2) carried by the pivot pin 42. When the pressure in line 184 is released and exhausted from the cylinder 90 by valve 96, the spring 106 urges the pivotally connected ends of the lever arms 66 and 70 from the position shown in FIG. 4 to the position shown in FIG. 5 to release the overcenter locking mechanism 64. With the overcenter locking mechanism 64 released, the biasing springs 58 urge the operator 18 toward the position shown in FIG. 3. Accordingly, the stanchion 34, upper arm 38 and the upper platen 14 are pivoted upwardly out of registration with and spaced from the lower platen 14 as shown in FIGS. 1 and 3.

A delay in displacing the lever 48 after the pressure is released from the cylinder 40 may be introduced, for example, by having a small diameter air line 186 thereby restricting the air flow from the cylinder 90. This delay avoids sudden separation of the platens from the heat applied transfers and apparel, which is often accompanied by suction or adherence, sometimes referred to as vacuum adhesion, between the lettering and the upper platen, tending to pull the lettering off the garment prior to complete curing of the lettering on the apparel. This delay enables ambient air pressure to enter between the platens before they are moved rapidly apart. Moreover, the speed of upper platen movement from the closed solid outline position of FIG. 6 to the open position of FIG. 1 is controlled by a damper such as the piston and cylinder arrangement 116 (FIG. 6) coupled between the lever 48 at end 118 and the base 16 by pin coupling 120.

Referring now to FIG. 7, the display 25 includes indicia such as LED's in the window 29 that designate operating parameters including the temperature, the pressure and the time duration during which the platens press against the transfer indicia and apparel between the pressing surfaces of the platens. The indicia may change as necessary to correspond to information delivered from the control board 100. The display is mounted on a raised support carried by the control board support 188 (FIG. 6) for visual alignment with the user. The time set for pressing is displayed and decremented as the timer on the control board 100 governs release and automatic displacement of the upper platen 12 with respect to the lower platen 14. The temperature detected at the sensor on heated platen 12 is also indicated on the display 25.

Referring now to FIG. 8, the predetermined pressure that is indicated on the display 25 refers to the pressure in the air conduits 122. The air pressure is controlled at the regulator valve 92, for example, by means of a manually operable rotary actuator 124 extending outwardly from a side of the top cover 126.

Figure 11:
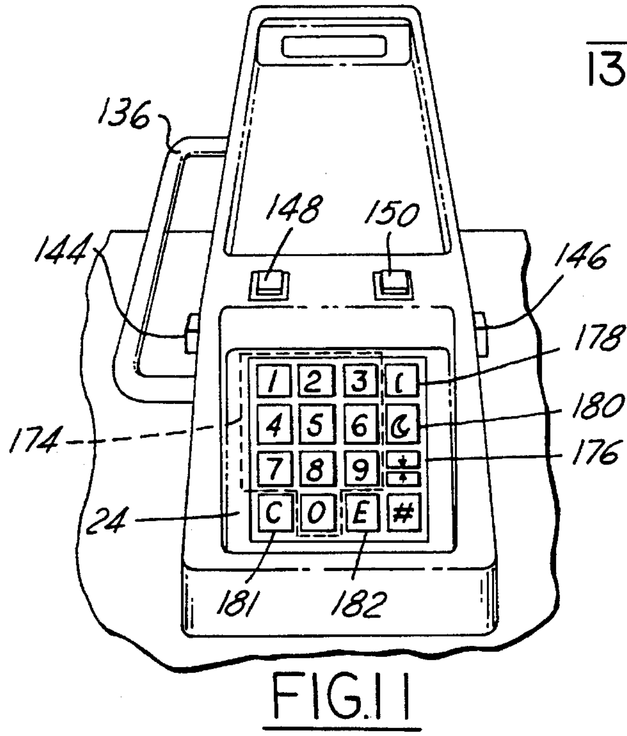
FIG. 11 is a front perspective view of a portion of the apparatus shown in FIGS. 9 and 10.

As best shown in FIG. 11, the keypad 24 includes a plurality of keys including a numeric key set 174. In addition, "Set Pressure" actuator 176 is pressed for indicating on display 25 the pressure sensed at the outlet of the regulator 92 by sensor 190 on pressure board 102.

A "Set Temp" actuator 178 and a "Set Time" actuator 180 are for selecting the temperature to which the platen is heated by the heating circuit controlled by the electronic controller 101 and the time duration set in the electronic control 101, when other information is displayed at the display 24 due to a priority selection delivered to the display 25 by electronic controller 101 in an alternative operating mode. In addition, actuation of the buttons or keys 178 and 180 enable the numeric key set 174 to enter alternative settings in the electronic control 101. In addition, a "Clear" actuator 181 allows error correction of input control data previously input at the numeric key set 174. An "enter" key 182 permits numerical key set inputs to be delivered to the electronic controller 101. The parameters selected for time duration and temperature are stored as default parameters until other parameters are selectively input by a user.

Figure 9:
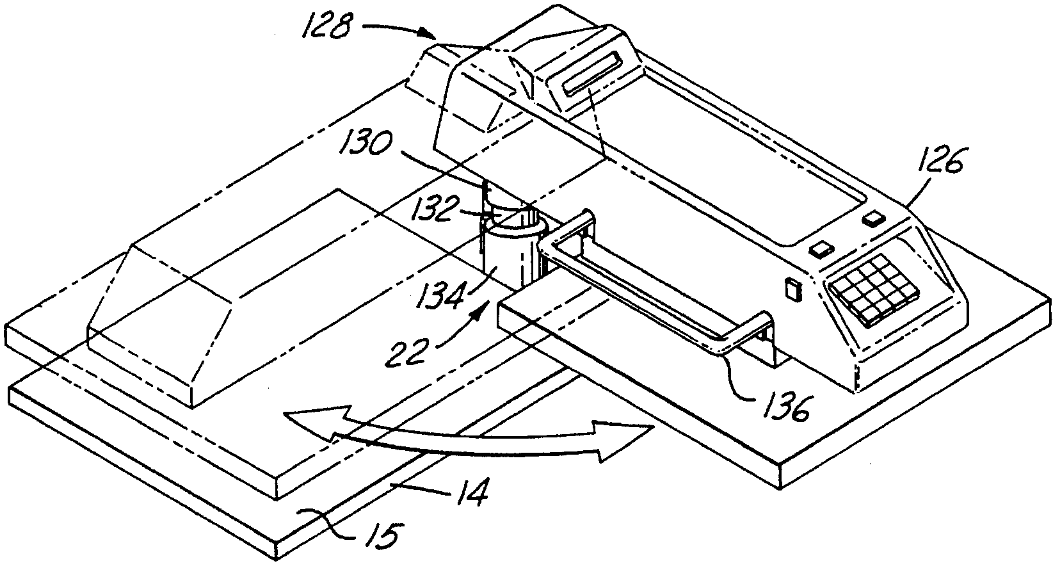
FIG. 9 is a perspective view of a modified heat transfer press with a pivot mechanism constructed according to the present invention.

Referring now to FIG. 9, a modified operator 128 replaces the operator 18 shown in FIGS. 1–8. The operator 128 is quite similar to the operator mechanism described in U.S. Pat. No. 5,252,171, incorporated by reference and need not be described in detail. However, for the sake of clarity, it will be understood that the support arm 38 that carries the platen 12 includes a socket 130. An enlarged vertically aligned pivot pin 132 is threaded into a base socket 134 to form the pivot mechanism 22. The pin 132 is telescopically received in the sockets 130 and 134 to permit horizontal pivoting about a vertical axis to and between the closed position shown in phantom line in FIG. 9, and the open position shown in solid line in FIG. 9. In the open position, the heated upper platen 12 is out of registration with and does not obstruct the pressing surface 15 of the lower platen 14.

The actuator 27 in this embodiment comprises a handle 136 extending outwardly of openings in the housing 126 and detachably secured, for example, by bolts extending through the handle and threaded into bores in the arm 38. A like arrangement of bores on the opposite side of the arm 38, and similar openings in the opposite side of housing 126, permits the handle 136 to be positioned on either of opposite sides of the housing 126 depending upon whether rotation to the left of the lower platen 14 or rotation to the right of the lower platen 14 is to be permitted by the pivot mechanism 22.

Figure 12:
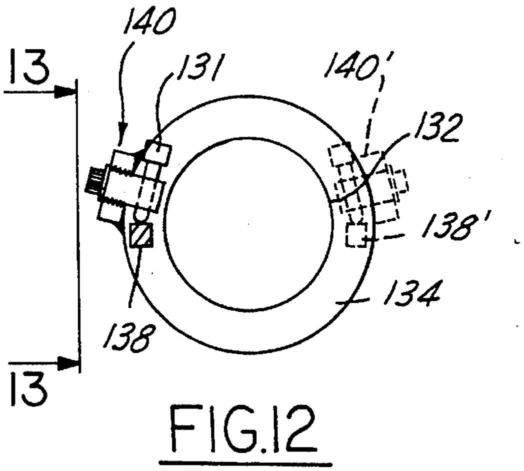
FIG. 12 is a sectional view taken through the pivot mechanism shown in FIG. 9.
Figure 13:
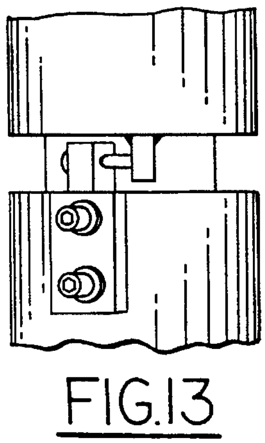
FIG. 13 is a side view taken substantially along the view of line 13—13 in FIG. 12.

In addition, referring to FIGS. 12 and 13, the pivot mechanism 22 includes a stop 138 welded on the socket 130 as well as a circumferentially adjustable abutment stop 140 bolted either in the solid outline position 140 or the phantom position 140', in holes spaced around the sleeve 134. When the stops 138 and 140 are positioned as shown in solid line in FIG. 12, the upper platen moves to its open position in the direction of the arrow shown in FIG. 9. On the other hand, when the upper platen is swung 180 degrees from the solid outline position of FIG. 9 to an opposite position such that stop 138 assumes the phantom position 138' shown in FIG. 12, and stop 140 is repositioned to the phantom position 140' and bolted to the sleeve, the upper platen 12 can then be swung to the left from the position above the lower platen shown in phantom outline in FIG. 9 to a fully open position which is on the opposite side of the lower platen from that shown in solid outline in FIG. 9. A post 129 on each stop 140 carries an adjustment screw 131 for abutment with the stop 138.

As shown in FIG. 11, the functional components of the housing 126 includes accessible controls for the electronic controller 101. In particular, side buttons 144 and 146 are depressed simultaneously to initiate lowering of the platen and start of "print" cycle operation similar to the switch 153 in the FIGS. 1–8 embodiments that initiates squeezing operation of the press. In the FIG. 11 embodiment, the upper left hand button 148 is depressed to initiate an emergency stop operation that automatically raises the upper platen from the pressing position. The upper right hand button 150 controls "mode" selection as alternate depressions switch the electronic controller 101 between a "print" mode engaging the platens in the pressing position for the selected time duration, and the "tack" mode where actuation of the control buttons 144 and 146 lowers the upper platen only until the buttons 144 and 146 are released. The "tack" mode enables indicia to be initially set, flattened and tacked to the apparel, then inspected after the buttons are released. The electronic controller 101 automatically raises the upper platen by operating cylinder 40 to retract piston arm 42, in the manner previously described, permitting visual inspection of the transfer before permanent attachment to the apparel.

Having thus described the present invention, many modifications thereto will become apparent to those skilled in the art to which it pertains without departing from the scope and spirit of the present invention as defined in the appended claims.

I claim:

1. A method of imprinting fabrics by heat sealing transfers thereto by squeezing the transfer against the fabric between a pair of horizontally arranged platens, the upper one of which is heated and vertically moveable toward and from the lower platen, comprising the steps of:

positioning the fabric on the lower platen;

positioning the transfer on the fabric;

moving the upper platen downwardly;

squeezing the upper platen against the transfer and fabric with a determined pressure;

holding the upper platen squeezed against the transfer and fabric on the lower platen for a predetermined time interval;

at the end of such time interval automatically releasing the squeezing pressure of the upper platen against the transfer and fabric for a period of time sufficient to permit ambient air pressure to enter between the platens and prevent vacuum adhesion between the upper platen and the transfer; and moving the upper platen away from the lower platen to permit removal of the fabric with the transfer thereon from the lower platen.

2. A method of imprinting fabrics by heat sealing transfers thereto by squeezing the transfer against the fabric between a pair of horizontally arranged platens, the upper one of which is heated and vertically moveable toward and from the lower platen, comprising the steps of:

positioning the fabric on the lower platen;

positioning the transfer on the fabric;

moving the upper platen downwardly;

squeezing the upper platen against the transfer and fabric with a determined pressure;

holding the upper platen squeezed against the transfer and fabric on the lower platen for a predetermined time interval;

at the end of such time interval automatically releasing the squeezing pressure of the upper platen against the transfer and fabric for a period of time sufficient to permit ambient air pressure to enter between the platens and prevent vacuum adhesion between the upper platen and the transfer; and moving the upper platen away from the lower platen to permit removal of the fabric with the transfer thereon from the lower platen, wherein said moving the upper platen downwardly step comprises placing said upper platen against the transfer and the fabric.

3. An air assisted manual transfer press comprising a base;

a lower platen mounted on the base;

an upper platen;

an upper platen support being manually displaceable and carrying the upper platen to and between a closed placement position in which said upper platen is aligned over the lower platen in close proximity and in registration with the lower platen, and a loading position in which said upper platen is spaced from the lower platen;

a heater in at least one platen for generating heat at a selectively predetermined temperature to said platen;

an actuator including a handle for manually controlling the aforesaid displacement of said upper platen from said loading position to said closed placement position;

an engager for selectively applying controlled pressure on said upper platen in said closed placement position to displace the upper platen from said closed position toward a pressing position against material upon said lower platen with a predetermined pressure by a displacer; and a releaser for automatically relieving said controlled pressure between said upper and lower platens after a selected time interval from actuation of said engager.

4. The invention as defined in claim 3 wherein said releaser further comprises a displacer for moving said upper platen from said pressing position to said raised position.

5. The invention as defined in claim 4 wherein said releaser further comprises an opener actuating displacement of said upper platen support from said closed position to said open position after a predetermined delay time from said selected time interval.

6. The invention as defined in claim 3 wherein said upper platen support comprises means for laterally displacing said upper platen to a laterally displaced open position spaced from an upper surface of said lower platen.

7. The invention is claim 6 wherein said means for laterally displacing comprise a pivot coupling between said upper platen support and said base.

8. The invention as defined in claim 3 wherein said upper platen support comprises means for vertically displacing said upper platen to a vertically displaced open position spaced from an upper surface of said lower platen.

9. The invention as defined in claim 8 wherein said means for vertically displacing comprises a pivot coupling between said upper platen support and said base.

10. The invention as defined in claim 3 wherein said engager includes means for adjusting the pneumatic pressure applied to displace said upper platen toward said lower platen.

* * * * *